United States Patent
Casteleiro

(10) Patent No.: US 6,878,923 B2
(45) Date of Patent: Apr. 12, 2005

(54) LOW PROFILE OPTICAL IMAGING SYSTEM HAVING A WIDE FIELD OF REGARD

(75) Inventor: Carlos A. Casteleiro, Altamonte Springs, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 79 days.

(21) Appl. No.: 10/263,660

(22) Filed: Oct. 4, 2002

(65) Prior Publication Data

US 2004/0065810 A1 Apr. 8, 2004

(51) Int. Cl.[7] ............................. H01J 3/14; H01J 40/14; H01J 5/16
(52) U.S. Cl. ....................................... 250/216; 250/239
(58) Field of Search ................................. 250/216, 239, 250/203.6; 348/143, 146; 356/360, 137.06, 137.04

(56) References Cited

U.S. PATENT DOCUMENTS

| | | |
|---|---|---|
| 4,386,848 A | 6/1983 | Clendenin et al. |
| 5,936,771 A | 8/1999 | Cooper |
| 5,973,309 A | 10/1999 | Livingston |
| 6,020,955 A | 2/2000 | Messina |
| 6,174,061 B1 | 1/2001 | Cooper |
| 6,226,125 B1 | 5/2001 | Levy et al. |

Primary Examiner—Thanh X. Luu
Assistant Examiner—Seung C. Sohn
(74) Attorney, Agent, or Firm—Burns, Doane, Swecker & Mathis, L.L.P.

(57) ABSTRACT

An optical system having a wide field of regard and a low profile comprises a first section with optically passive components stationarily fixed within the optical system for focusing optical energy associated with a field of regard received by the first section, and second section. The second section includes at least one gimbal drive assembly for establishing the field of regard by actively driving an additional optical component used to guide optical energy to or from the first section. The second section can include both an azimuthal gimbal drive assembly and an elevation gimbal drive assembly. The first section can be mounted to an interface structure, which pivotally mounted to the airframe of the vehicle. The second section can be rotatably mounted to the first section, so the first section remains stationary while the gimbals of the second section rotate.

23 Claims, 4 Drawing Sheets

LOW PROFILE OPTICAL IMAGING SYSTEM HAVING A WIDE FIELD OF REGARD

BACKGROUND OF THE INVENTION

1. Field of the Invention

The invention relates to an optical imaging system, that can, for example, be mounted to a vehicle.

2. Background Information

Optical imaging systems can be mounted externally to an aircraft for detection and targeting, and can include a structure, such as an optical bed, with associated gimbal drive assemblies. Lasers of the desired wavelength can be used as the coherent light source.

These imaging systems can be located within a pod which is attached to the fuselage or wings of the aircraft. The optical components of the system can be mounted within an optical bed of the pod, the optical bed holding the optical components in optical alignment, and preventing contamination of the optical components by dust, humidity, or other environmental conditions.

An example of a forward looking infrared (FLIR) system contained within a pod is found in U.S. Pat. No. 6,020,955 (Messina). In this system, all the optical components and the gimbals used to point the imaging system are contained within optical beds contained within a pod. In U.S. Pat. No. 4,386,848 (Clendenin), an optical target tracking and designating system has its optical components and a gyrostabilizer located within an optical bed, the optical bed being contained within a housing attached to the mast on a helicopter.

To maintain these imaging systems, the pod is removed from the aircraft, and the structure within the pod which contains the optical components is opened. The optical components are tested and replaced if necessary, and the structure and the pod are reassembled and reattached to the aircraft. These repairs can take a significant amount of time, adding to crew workload and decreasing mission readiness. For example, current pod-mounted optical imaging systems can have a mean-time-to-repair in excess of 2 hours.

Some current imaging systems locate most or all of the optical components within the optical bed, and mount the optical bed on a two axis gimbal, so the entire optical bed is movable. An example of an imaging system for a tracked vehicle which includes both a laser transmitter and a laser receiver mounted to a gimballed support is found in U.S. Pat. No. 5,973,309 (Livingston). U.S. Pat. No. 6,226,125 B1 (Levy), and U.S. Pat. No. 5,936,771 (Cooper), are examples of imaging systems which are contained within a spherical housing which rotates on a gimbal base.

SUMMARY OF THE INVENTION

The present invention is directed to an optical system having field of regard, which comprises a first section containing optically passive components stationarily fixed within the optical system for focusing optical energy associated with the field of regard received by the first section, and a second section containing at least one gimbal drive assembly for establishing the field of regard by actively driving an additional optical component used to guide optical energy relative to the first section.

BRIEF DESCRIPTION OF THE FIGURES

Other objects and advantages of the present invention will become apparent to those skilled in the art upon reading the following detailed description of the preferred embodiments, in conjunction with the accompanying drawings, wherein like reference numerals have been used to designate like elements, and wherein.

DETAILED DESCRIPTION OF PREFERRED EMBODIMENTS

Figure 1:
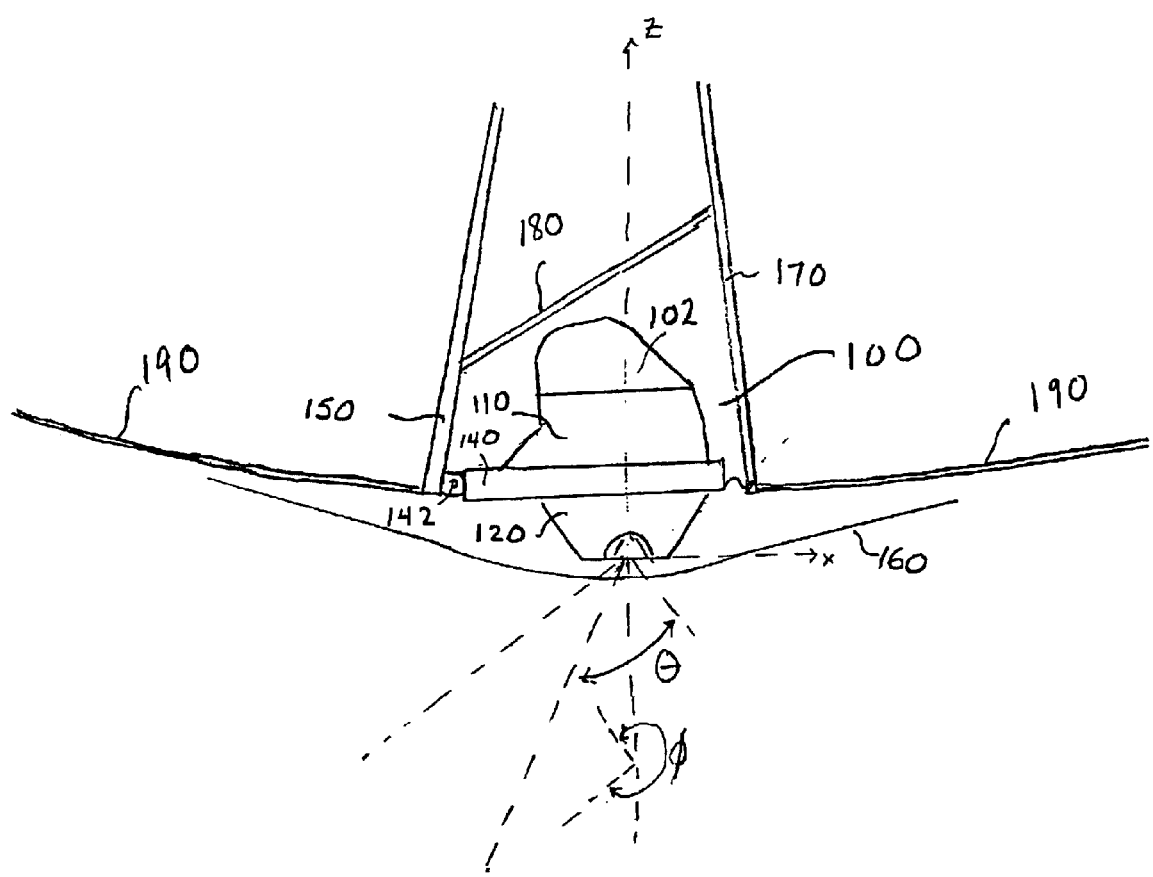
FIG. 1 illustrates an optical system of the invention in an operational position attached to an aircraft.

FIG. 1 illustrates an exemplary embodiment of the present invention as an optical imaging system having a field-of-regard. In the FIG. 1. embodiment, the optical system 100 has a field of regard, represented as the angle or angles over which the optical system can transmit or receive optical energy. The field of regard can be described, for example, in a spherical coordinate system by an elevation angle $\theta$ through which the system can transmit and/or receive optical energy about a horizontal or elevation axis X, and an azimuthal angle $\phi$ through which the system can transmit and/or receive optical energy about a vertical or azimuthal axis Z. These angles are an indication of the size of the field of regard. Th field of regard can be described in various other ways, for example, by a single angle about a single axis, or by two angles corresponding to a forward/rear dimension and a width dimension, or in any desired manner.

The optical system 100 has an exemplary first section 110 containing optically passive components stationarily fixed within the optical system for focusing optical energy associated with the field of regard received by the first section. The optical system 100 also has an exemplary second section 120 containing at least one gimbal drive assembly for establishing the field of regard by actively driving an additional optical component used to guide optical energy relative to (e.g. to or from) the first section.

The additional optical component can be any type of optical component suitable to transmit or receive optical energy to or from the environment, such as, for example, a lens, mirror, or even another gimbal assembly having an optical path for optical energy to and/or from the environment.

The first section 110 can include both active and/or passive optical components. Optically passive components can be any components which do not generate optical energy, including, but not limited to lenses, beam splitters, focus mechanisms, flip mirror assemblies, cameras, and television units. In contrast, optically active components include those components which do generate optical energy, such as laser generators 102 that produce laser beams.

Figure 2:
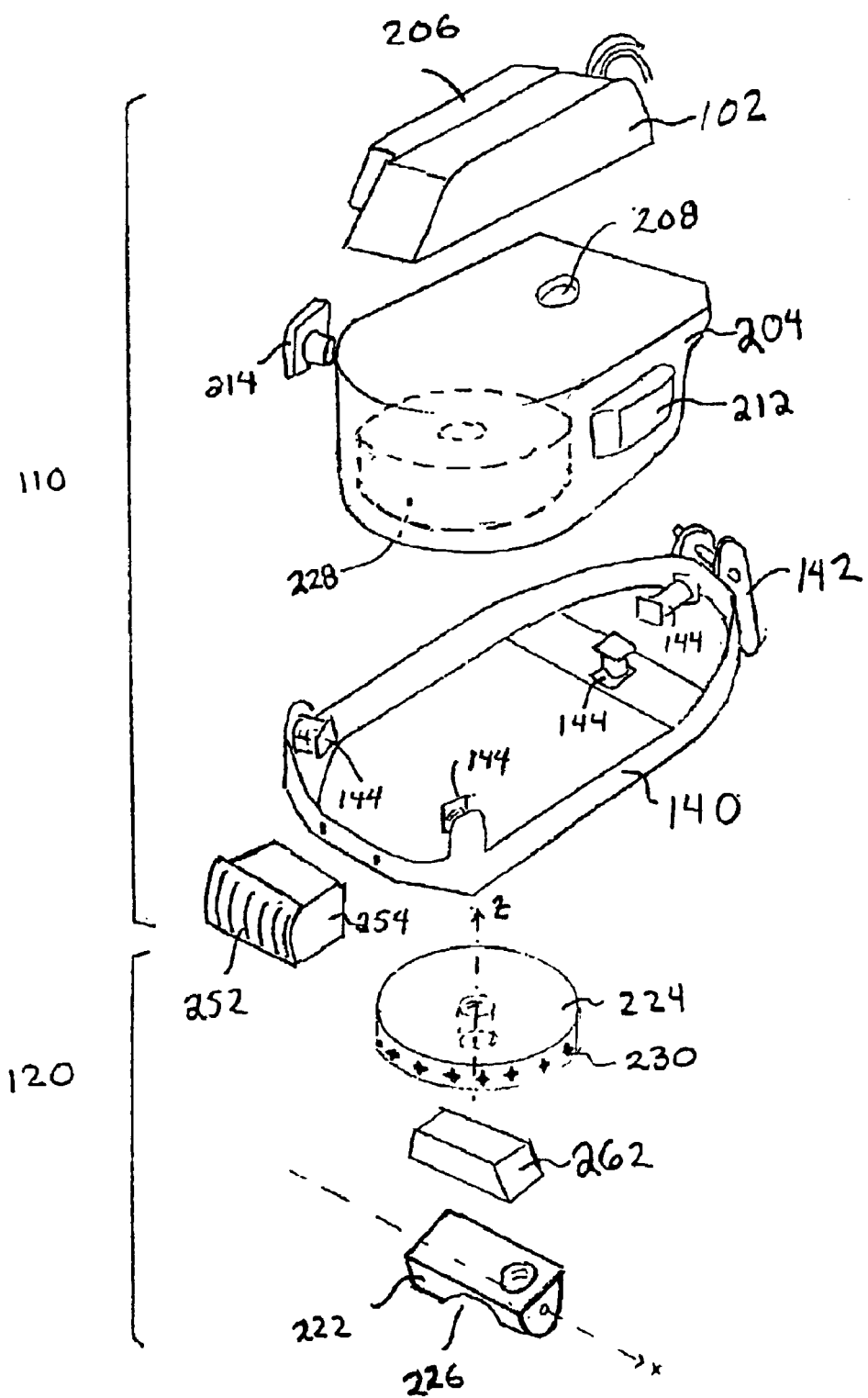
FIG. 2 is an exploded view of a portion of the exemplary FIG. 1 optical system.

FIG. 2 is an exploded view of a portion of the exemplary optical system 100. The optical components in the first section 110 can be mounted within and/or externally to a casing 204, to provide proper optical alignment. The casing 204 acts as an optical bed for the internally mounted optical components and the externally mounted optical components. The casing 204 can be any structure having an interior and an exterior and that is sufficiently rigid to maintain optical components that are mounted to it in optical alignment with each other.

In an exemplary embodiment, components with low failure rates and/or components requiring less frequent maintenance can be mounted within the casing 204, while optical components requiring more frequent maintenance and/or having a higher failure rate can be mounted external to the casing 204. This could reduce the need to open the casing 204 to perform maintenance and/or inspection, and reduce the likelihood that internal optical components will be misaligned or contaminated with dust or other particles when maintenance is performed.

Figure 3:
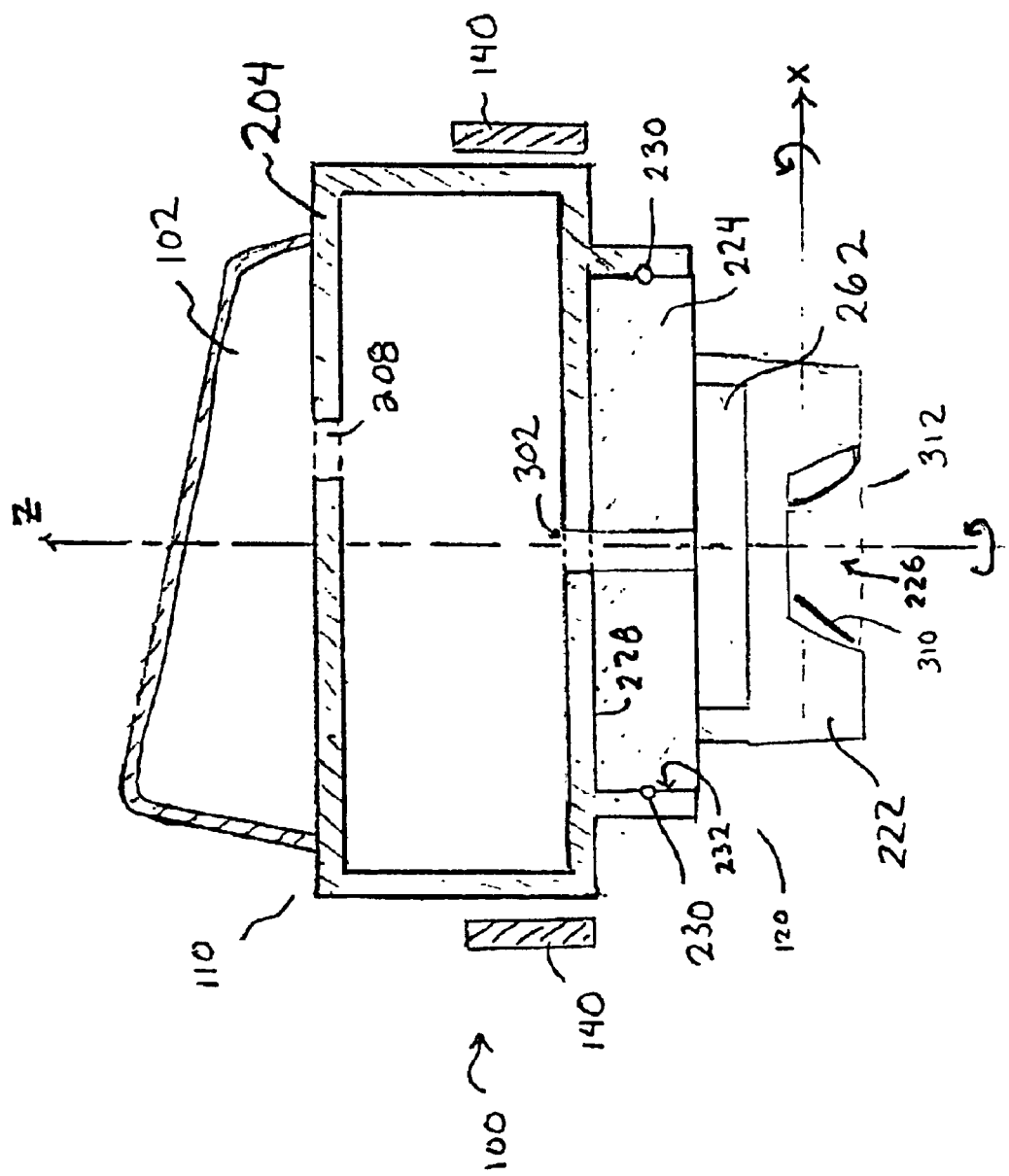
FIG. 3 is a cross sectional view of exemplary FIG. 1 optical system.

In the exemplary embodiment shown in FIGS. 1, 2, and 3, a laser generator 102 for generating a laser beam is mounted externally to the casing 204. The external mounting of the laser generator 102 is advantageous for several reasons. First, the laser generator 102 is easily replaced or removed for maintenance without opening the casing 204. Second, externally mounting the laser generator 102 allows a cooling system 206 for the laser generator 102 to be positioned external to the casing 204, because the externally mounted laser generator 102 does not require the cooling system 206 to penetrate the casing 204. This greatly simplifies the manufacture, installation, and maintenance of the cooling system 206. The cooling system 206 can be an integrated assembly, or any other cooling device suitable to provide cooling to the laser generator.

The first section 110 can also include a laser range receiver/enhanced recognition television receiver (LR/ERTV) unit 212, which can be mounted either within or externally to the casing 204. When the LR/ERTV unit 212 is externally mounted, it can be rapidly and easily replaced if necessary without opening the casing 204. As illustrated in FIG. 2, a laser spot tracker 214 can also be mounted to the casing 204 of the first section 110.

As illustrated in FIGS. 2 and 3, the first section 110 has at least one aperture through which optical energy can pass. The aperture or apertures can be either an opening extending through the casing, or can be a structure or window which is substantially transparent at a desired wavelength window which is transparent to the optical energy at the desired wavelength. For example, the casing 204 can have an aperture 208 positioned in an optical path for the laser beam generated by the laser generator 102 and optical components within the casing 204. FIG. 3 also illustrates an aperture 302 positioned between the first section 110 and the gimbal assemblies 224, 222. In an exemplary embodiment, the aperture 302 is located along the rotational axis of the second gimbal drive assembly 224, so optical energy will pass through the aperture 302 without being obstructed during rotation. In an exemplary embodiment of the invention, the aperture 302 is used for both visible and laser radiation, although it is also contemplated that more than one aperture and/or optical path can be used.

The first section 110 can also include other apertures through which optical energy is transmitted, positioned between the internal optical components of the first section and components external to the casing. For example, the casing 204 can also include other apertures for the laser range receiver/enhanced recognition television unit 212 and the laser spot tracker 214, if present.

In the exemplary embodiment of FIG. 2, the second section 120 includes both a first gimbal drive assembly 222 and a second gimbal drive assembly 224. The first gimbal drive assembly 222 rotates about a first axis X, which is also known as an elevation axis. In the exemplary embodiment of FIG. 2, the first gimbal drive assembly 222 has an aperture 226 through which the optical system 110 can receive and transmit optical energy from the environment.

When the optical system 100 is mounted to the undercarriage of an aircraft or other vehicle, the first gimbal assembly 222 and the second gimbal assembly 224 together establish the field of regard in elevation and azimuth.

As illustrated in FIGS. 2 and 3, the second gimbal drive assembly 224 is rotatably mounted to the first section 110, so that the first section 110 remains stationary with respect to the vehicle while the second gimbal drive assembly 224 rotates about an axis Z. In an exemplary embodiment, the second axis Z is perpendicular to the first axis X.

The second gimbal drive assembly 224 can include bearings 230 which allow the second gimbal drive assembly 224 to rotate about the axis Z while the first section 110 remains stationary. In an exemplary embodiment of the invention, the casing 204 of the first section has a recess 228 sized to receive at least a portion of the second gimbal drive assembly 224 and the bearings 230. As shown in FIGS. 2 and 3, the second gimbal assembly 224 has a cylindrical shape, with the bearings 230 positioned along a peripheral surface of the second gimbal assembly 224. The recess 228 of the casing 204 is also cylindrical in shape, and has a cylindrical surface 232 against which the bearings 230 rotate.

The first gimbal assembly 222 is mounted to the second gimbal assembly 224, so that the first gimbal assembly 222 also rotates together with the second gimbal assembly about the second axis Z. In addition, the first gimbal assembly rotates about an X axis.

Both the first and second gimbal drive assemblies 222, 224 can include torque motors (not shown) which drive the gimbal drive assemblies. In an exemplary embodiment, the first gimbal assembly 222 can also include an objective lens 312 that is incorporated directly into the gimbal's torque motor. In addition, the first gimbal assembly 222 can include a fold mirror 310 that transmits laser pulses and can receive both infrared and visible energy. In an exemplary embodiment, the first gimbal assembly 222 has a diameter of only 5¼ inches, and has an aperture size of 5 inches, thus providing both a large field of regard and aperture size and a low profile.

In an exemplary embodiment, the first gimbal assembly can rotate 360 degrees around the first axis X, and the second gimbal assembly can rotate 360 degrees around the second axis of rotation z. This defines a very large field of regard of the optical system, which is limited only by any obstructions presented by the vehicle itself. Gimbals having less than 360 degrees of rotation can also be used. For example, gimbals having 180 degrees of rotation or even less will also provide a large field of regard.

Thus, as illustrated in FIG. 1, the optical system 110 can be mounted to a structure of a vehicle, such that the first gimbal assembly 222 extends only a small distance below the vehicle frame 190, so the field of regard is not obstructed by the vehicle frame. Because the gimbal drive assemblies 224, 222 define a large field of regard in a system which has a low profile, any detrimental effect on the vehicle's aerodynamic performance is minimized.

Figure 4:
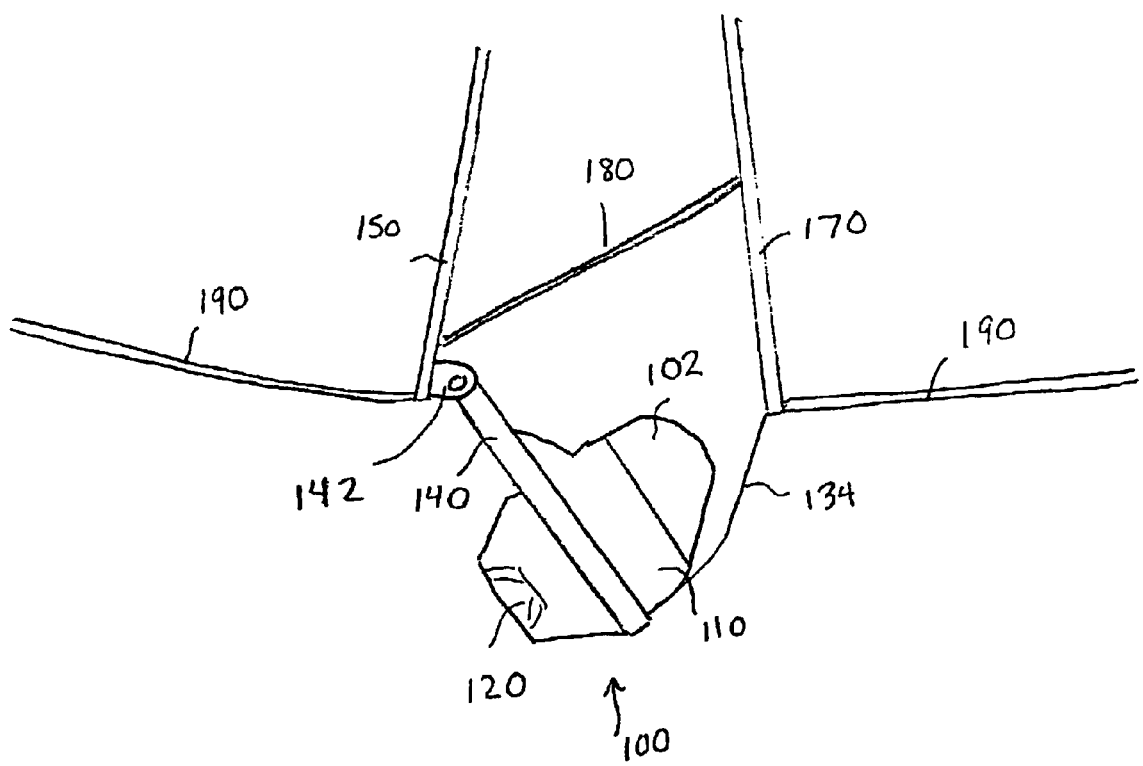
FIG. 4 illustrates the exemplary optical system of FIG. 1 in a maintenance position.

The optical system 100 can also include an interface 140 by which the optical system 100 can be mounted to a vehicle. In an exemplary embodiment, and as illustrated in FIGS. 1, 2, and 4, the interface 140 can include a hinged joint 142 for pivotally attaching the optical system 110 to the vehicle. In the exemplary embodiment shown in FIGS. 1 and 4, the hinged joint is attached to a radar bulkhead 150 of an aircraft.

The hinged joint 142 of the interface 140 is intended to allow the optical system 110 to be positioned in either an operational position or an access/maintenance position. As shown in FIG. 1, the optical system 100 is in an operational position. When access to the optical system 110 is required, the optical system can be lowered to its access position, as shown in FIG. 4, by rotating the interface 140 about the hinged joint 142 which attaches the interface 140 to the radar bulkhead 150 (or to another structure of the vehicle). Additional fasteners (not shown) and/or a cable 134 can also be connected to the interface 140 and to the vehicle to keep the optical system 110 in its operational position when access to the optical system is not required.

In an exemplary embodiment of the invention, the first section 110 is mounted to the interface 140 in such a way as to reduce the vibration transmitted from the vehicle to the optical system. In the exemplary embodiment illustrated in FIG. 2, the first section 110 only is attached to the interface 140, and the first section 110 is attached to the interface by vibration isolators 144 that are positioned between the casing 204 and the interface 140. The vibration isolators 144 can be any type of mechanical mount suitable to isolate the first section from most of the vibration transmitted by the vehicle to the interface. The casing 204 can be attached by bolts or other attachment devices to the vibration isolators 144. The vibration isolators 144 can be mounted to the interface 140 structure.

As is clear from FIG. 1A, another advantage of this configuration is that the optical system 110 has a low profile, and extends below the vehicle structure a distance about equal to the diameter or height of the first gimbal assembly 222.

The optical system 110 according to the described embodiments also has improved maintainability compared to pod-mounted systems. The maintainability of a system can be described by the mean-time-to-repair (MTTR) of that system, which can be can be found by determining the maintenance time (for example, the total time required to remove and repair or replace failed components of the optical system after the system has been lowered) over a period of time, then dividing the maintenance time by the corresponding number of maintenance actions performed during that period. A low MTTR of the optical system 100 results from several features of the present invention. First, inclusion of low failure rate components within the interior of the casing 204 of the first section 110 contributes to a low MTTR. Easily accessible and replaceable optical components (line replaceable units or "LRUs") mounted externally to the casing also contributes to the low MTTR. The pivotal attachment of the interface 140 to the vehicle allows easy access to the optical system 110, and therefore also contributes to a low MTTR. The MTTR of an exemplary optical system 100 described herein is less than 15 minutes. In comparison, pod-mounted optical systems have a MTTR in the range of three to six hours.

Exemplary embodiments of the optical system can also include additional features and components.

In an exemplary embodiment of the invention, and as shown in FIG. 2, sensor electronic cards 252 are mounted in a card cage assembly 254 attached to either the interface 140, the outside of the casing 204, to another component of the first section 110 of the optical system 100. In the embodiment shown in FIG. 2, the card cage assembly 254 is attached to interface 140. This allows the electronic cards 252 to be easily accessed and rapidly replaced if necessary.

In an exemplary embodiment, the second section 120 includes a deroll/fast steering mirror assembly 262 positioned between the first gimbal assembly 222 and the second gimbal assembly 224, with a housing mounted to the second gimbal assembly 222. The deroll/fast steering mirror assembly 262 includes a scanning mirror that rotates to provide a scan function for the laser, and particularly for a laser infrared search and track function. The deroll/fast steering mirror can also stabilize the laser beam in both the azimuthal and elevation directions to compensate for vehicle movement. The deroll/fast steering mirror assembly 262 can also include a deroll prism (not shown) that rotates the image received from the rotating second section 120, so the stationary optical components (e.g. the "off-gimbal" components that are part of the first section 110) receive an upright image.

It is advantageous to mount the optical system 110 in such a way that the optical system is protected from rain, dust, humidity, and other contaminants. For example, and as shown in FIG. 1, the optical system 100 is in a compartment formed by the external fairing 160, a radar bulkhead 150, a nosegear bulkhead 170, and a cover panel 180.

The portion of the external fairing 160 covering the optical system can be an optical window (e.g. substantially transparent to optical energy at the operational wavelengths of the system). An example of a suitable material for the optical window is sapphire, which has good optical properties and high strength, although other materials which are substantially optically transparent at desired wavelengths may also be used.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive, and the scope of the invention is to be determined by reference to the appended claims.

What is claimed is:

1. An optical imaging system having a field of regard comprising:
    a first section comprising a casing containing optically passive components stationarily fixed within the casing for focusing optical energy associated with the field of regard received by the first section; and
    a second section containing at least one gimbal drive assembly for establishing the field of regard by actively driving an additional optical component used to guide optical energy relative to the first section, wherein the additional optical component is situated to the exterior of the casing.

2. An optical imaging system as in claim 1, comprising:
    a laser range receiver adapted to receive a reflected laser image and to determine a range to a target, the laser range receiver mounted external to the casing of the first section.

3. An optical imaging system as in claim 1, comprising an enhanced recognition television receiver mounted external to the casing of first section.

4. An optical imaging system as in claim 1, wherein
    the second section includes a first gimbal drive assembly for driving the additional optical component in rotation about a first axis and a second gimbal drive assembly for driving the first gimbal drive assembly and the additional optical component about a second axis.

5. An optical imaging system as in claim 4, wherein the second axis is perpendicular to the first axis.

6. An optical imaging system as in claim 4, wherein the second gimbal drive assembly is located between the first section and the first gimbal drive assembly, and wherein the second gimbal drive assembly has an aperture extending through the second gimbal drive assembly aligned with an aperture in the casing of the first section.

7. An optical imaging system as in claim 4, wherein the casing of the first section has a recess and the second gimbal drive assembly is at least partially located in the recess in the casing.

8. An optical system as in claim 7, wherein the second gimbal drive assembly includes bearings, and the bearings engage a surface of the recess.

9. The optical imaging system as in claim 4, comprising:
a laser generator; and
a scanning mirror optically positioned between the first section and the first gimbal drive assembly, wherein a steering mirror steers a beam of laser energy in a search pattern during operation.

10. The optical imaging system as in claim 1 comprising:
an interface adapted to connect the optical system to a vehicle, wherein the first section is mounted to the interface.

11. The optical imaging system as in claim 10, comprising:
vibration isolators positioned between the first section and the interface for reducing structural vibrations transmitted from the interface to the first section.

12. The optical imaging system as in claim 10, wherein the interface is adapted to be pivotally mounted to the vehicle, and wherein the optical system is supported by the interface in at least two positions with respect to the vehicle.

13. The optical imaging system as in claim 12, wherein the interface comprises a pivotal joint, wherein the optical system is moved between the at least two positions by pivoting the interface at the pivotal joint with respect to the vehicle.

14. The optical imaging system as in claim 1 in combination with an optical window of a vehicle.

15. The optical imaging system as in claim 14, wherein the optical window comprises sapphire.

16. An optical imaging system having a field of regard comprising:
a first section comprising a casing containing optically passive components stationarily fixed within the casing of the optical system for focusing optical energy associated with the field of regard received by the first section; and
a second section containing at least one gimbal drive assembly for establishing the field of regard by actively driving an additional optical component used to guide optical energy relative to the first section, wherein the first section comprises at least one active optical component mounted external to the casing.

17. An optical imaging system as in claim 16, wherein the at least one active optical component include a laser generator.

18. The optical imaging system as in claim 17, comprising:
sensor electronics for processing a reflected laser image, the sensor electronics located external to the casing.

19. The optical imaging system as in claim 17, comprising:
a laser spot tracker located external to the casing.

20. An optical imaging system as in claim 17, comprising:
a cooler for cooling the laser generator located external to the casing.

21. An optical imaging system having a field of regard comprising:
a first section containing optically passive components stationarily fixed within the optical system for focusing optical energy associated with the field of regard received by the first section; and
a second section containing at least one gimbal drive assembly for establishing the field of regard by actively driving an additional optical component used to guide optical energy relative to the first section, wherein the additional optical component is rotatable through 360 degrees about at least a first axis by the at least one gimbal drive assembly.

22. An optical imaging system as in claim 21, wherein the second section includes a first gimbal drive assembly for driving the additional optical component in rotation about the first axis and a second gimbal drive assembly for driving the first gimbal drive assembly and the additional optical component about a second axis.

23. An optical imaging system as in claim 22, wherein the additional optical component is rotatable through 360 degrees about the first axis and the second axis by the gimbal drive assembly.

* * * * *

UNITED STATES PATENT AND TRADEMARK OFFICE
CERTIFICATE OF CORRECTION

PATENT NO. : 6,878,923 B2  
APPLICATION NO. : 10/263660  
DATED : April 12, 2005  
INVENTOR(S) : Casteleiro et al.

Page 1 of 1

It is certified that error appears in the above-identified patent and that said Letters Patent is hereby corrected as shown below:

On Title Page  
The correct name inventor as  
Item 75  
Carlos A. Casteleiro, Altamonte Springs, FL  
David J. Falabella, Merritt Island, FL  
Thomas E. Haberfelde, Clemont, Fl Signed and Sealed this Twenty-fifth Day of December, 2007

JON W. DUDAS  
*Director of the United States Patent and Trademark Office*